United States Patent [19]

Ramachandran

[11] Patent Number: 4,921,819

[45] Date of Patent: May 1, 1990

[54] HAFNIA MODIFIED ALUMINA FIBERS

[75] Inventor: Seshadri Ramachandran, Hockessin, Del.

[73] Assignee: E. I. Dupont de Nemours and Company, Wilmington, Del.

[21] Appl. No.: 100,760

[22] Filed: Sep. 24, 1987

[51] Int. Cl.$^5$ .............................................. C03C 6/00
[52] U.S. Cl. ................................... 501/127; 501/134; 501/152; 428/364
[58] Field of Search ................. 501/127, 134; 428/364; 264/125

[56] References Cited

U.S. PATENT DOCUMENTS

| | | | |
|---|---|---|---|
| 3,180,741 | 11/1960 | Wainer | 106/39 |
| 3,270,109 | 3/1963 | Kelsey | 214/178 |
| 3,311,481 | 3/1962 | Sterry et al. | 106/57 |
| 3,663,182 | 5/1972 | Hamling | 23/355 |
| 3,992,498 | 10/1973 | Morten et al. | 264/63 |
| 4,285,732 | 3/1980 | Charles | 106/57 |
| 4,552,852 | 6/1984 | Manning | 501/105 |
| 4,665,040 | 12/1984 | Kurita | 501/105 |
| 4,753,904 | 1/1988 | Wolfe | 501/95 |
| 4,804,645 | 2/1989 | Ekstrom | 501/105 |

FOREIGN PATENT DOCUMENTS

| | | |
|---|---|---|
| 0212659 | 8/1986 | European Pat. Off. . |
| 8501936 | 10/1984 | PCT Int'l Appl. . |
| 1264973 | 2/1972 | United Kingdom . |
| 2067177 | 5/1980 | United Kingdom . |
| 2074559 | 4/1981 | United Kingdom . |

OTHER PUBLICATIONS

Advances in Ceramics, vol. 3, Science & Tech. of Zirconia Int. J. High Tech. Ceramics 2 (1986) 207–219.
Inorganic Matls. 12 (1976) 1331–34.
Advances in Ceramics, vol. 3, Science & Tech. of Zirconia
Advances in Ceramics, vol. 12, Science & Tech. of Zirconia. Dopov. Akad. Nauk Ukr. A–6, 73–5(1985).
Dopov. Akad. Nauk Ukr. A–7, 80–83 (1981).
Fracture Mechanics of Ceramics, Bradt 903–912.

*Primary Examiner*—Stephen J. Lechert, Jr.

[57] ABSTRACT

Alumina fibers which incorporate hafnia and optionally zirconia plus a fourth oxide exhibit surprising grain refinement on sintering, and thereafter excellent retention of strength after exposure to high temperatures.

13 Claims, 4 Drawing Sheets

1μm

1μm

1μm

1μm

F I G. 5
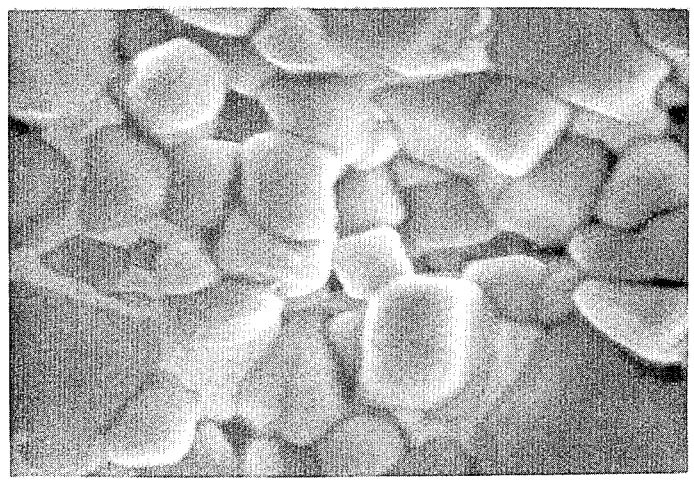
1μm
F I G. 6
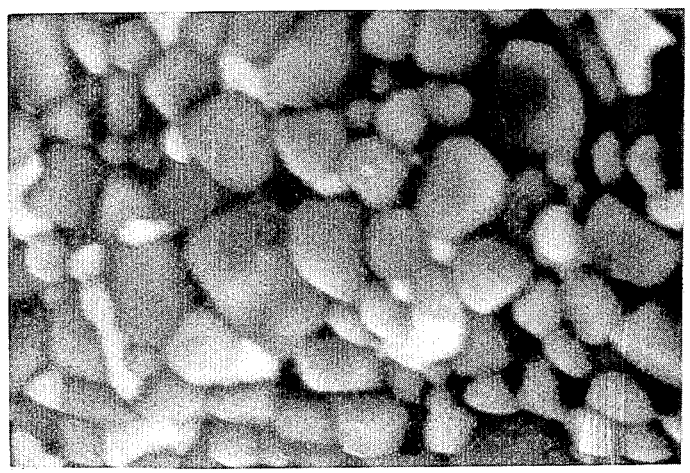
1μm

1 μm

1 μm

HAFNIA MODIFIED ALUMINA FIBERS

BACKGROUND OF THE INVENTION

This invention relates to polycrystalline ceramic fibers containing alumina and hafnia and optionally, other metal oxides, and novel intermediates for their production. The process of reducing the grain size of these compositions is also a part of the invention.

Claussen et al. and Kriven et al. present studies of a system of alumina, zirconia and hafnia. Advances in Ceramics, Vol. 3, Science and Technology of Zirconia, Heuer and Hobbs, ed. 1981 and Advances in Ceramics, Vol.12, Science and Technology of Zirconia II, Claussen Ruhle and Heuer, ed., 1984, respectively. L.M. Lopato et al. present a phase diagram for alumina/hafnia in Izvestiya Akademii Nauk SSSR, Neorganicheskie Materialy, February 1977, pp1331–1334. Int. J. High Technology Ceramics 2 (1986) 207–219 reports a study of systems of the oxides of aluminum, chromium, zirconium and hafnium. U.S. Pat. No. 4,665,040 discusses alumina/zirconia powders possibly containing hafnia as an impurity. None of these references recognizes or teaches anything about grain refinement in alumina/hafnia systems, and none of these references suggests alumina/hafnia fibers.

A number of references teach formation of ceramic fibers. Representative of these references are U.S. Pat. Nos. 4,125,406; 3,308,015; 3,992,498; 3,950,478; 3,808,015 and U.K. No. 1,360,198. None of these mention hafnia containing alumina fibers. One patent, U.K. No. 1,264,973 lists hafnium oxide as a possible inclusion in alumina fibers (page 1, line 76) but there is no teaching of such a fiber or any recognition of superior properties. None of the references suggests the preferred combination of oxides or the fibers of this invention.

Ceramics, in general, are formed by shaping a mixture of powders and binders and/or precursors into "green" forms such as fibers and other articles. These "green" articles are then heated carefully to remove volatile matter and are then sintered at high temperatures to remove porosity and densify their microstructures. However during this high temperature sintering process, the grain sizes in the ceramics increase with increasing time at temperature. Generally, the longer the times and/or higher the temperature, the larger the size of the grains. This invention provides ceramic fibers with the property of grain refinement or reduction during sintering. These fibers also exhibit excellent retention of strength after exposure to high temperatures.

FIGURES

The figures are photomicrographs that show the decrease in grain size of the hafnia/alumina/zirconia/yttria ceramic fibers of the invention as they are sintered FIGS. 1–4 show fiber cross section after 3, 6, 9 and 12 seconds of sintering.

FIGS. 5–8 show fiber surface after 3, 6, 9 and 12 seconds of sintering.

SUMMARY OF THE INVENTION

The present invention provides polycrystalline ceramic fibers or other shaped articles which have the property of undergoing grain size refinement as they are sintered. Fibers are preferred. The ceramic fibers and shaped articles comprise 50 to 99 volume percent alpha-alumina, and 1 to 50 percent hafnia. Preferred fibers comprise 85 to 97 volume percent alpha-alumina and from 3 to 15 volume percent hafnia. More preferred fibers contain 50–98% alumina, 1–49% hafnia and also contain zirconia in an amount from 1 to 48 volume percent, and a fourth oxide selected from the group of oxides of lithium, calcium, magnesium, yttrium or a metal of the lanthanide series. The fourth oxide is present in an amount equal to 0.002 to 12 volume percent based on the total volume. A preferred composition contains from 75 to 98 volume percent alumina, 2 to 25 volume percent hafnia and 0 to 23 volume percent zirconia, and a fourth oxide as above. A still more preferred fiber contains 75–96% alumina, 3–15% hafnia and 1–22% zirconia. A fiber which is still more preferred contains 80–95% alumina, 3–15% hafnia and 2–17% zirconia. The preferred fourth oxide is yttria.

The fibers of this invention can be used to reinforce composites wherein the matrix is a ceramic composition, metal, or a plastic. Fibers within the scope of the invention are from 10 to 125 or preferrably 10 to 50 microns in diameter.

The shaped articles and fibers of this invention undergo grain size refinement, i.e., a reduction in grain size on heating. The preferred heating temperature is 1800 degrees Celsius or more, but temperatures in excess of 1500 or 1700 degrees may also be employed. The presence of zirconia or a fourth oxide is not required to obtain the grain size refinement on sintering. Other ceramic materials may be present in the mixture without detracting from the operability of the grain refinement process, or the strength of the ceramic articles produced.

DETAILED DESCRIPTION OF THE INVENTION

Figure 1:
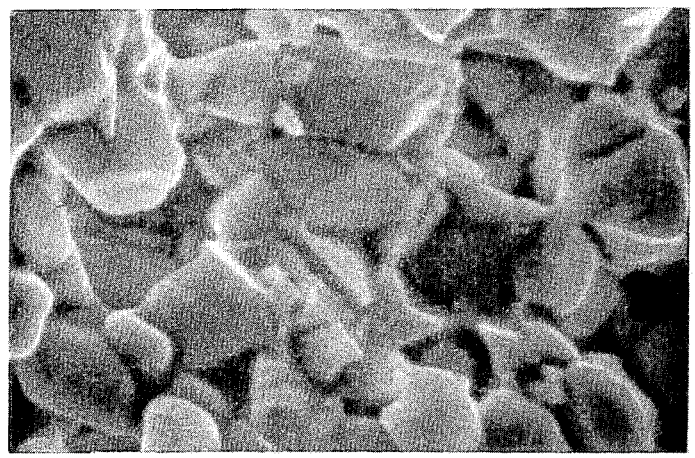

Fibers and shaped articles may be formed from dispersions of the ingredients of the composition, or precursors of the ingredients of the composition, as is well known in the art.

The fibers of this invention are useful in the reinforcement of resin, polymer, glass, ceramic metal, etc. matrices to provide structures such as composites, laminates, prepregs and the like. The fibers may be employed as continuous filaments, short fibers, combinations thereof, and/or hybridized with other fibers for reinforcing purposes. Sheet products (papers etc.) can be prepared from short fibers. The fibers may be coated to enhance performance for specific applications. Fibrous preforms may be infiltrated by pressure, squeeze or vacuum casting of molten metals. Ceramic matrices may be prepared by sol-gel infiltration of suitable precursors or by chemical vapor deposition techniques. The end result of these and related operations will be a shaped article generically termed a "composite". The alumina in the article is derived from a dispersion of alumina particles and from a soluble alumina precursor. The alumina particle size distribution should be as follows: 99% smaller than 1 micron, 95% smaller than 0.5 micron, as determined by standard "Sedigraph" measurement. Particulate materials can be classified by any of a variety of known techniques. In one method for preparing such particles, alpha alumina (Alcoa A-16SG) is dispersed in water at 15% solids at a pH of 4.0 and allowed to settle in a tank. Portions of the dispersion are removed from the top of the sedimentation tank and concentrated to the desired solids level for use. It should be noted that while use of fine particles is preferred, larger alumina particles may be employed and this alumina dispersion can also be use in its commercial form without sedimentation. Preferred soluble alumina precursors include the basic aluminum salts, such as aluminum chlorohydrate, basic aluminum nitrate, and basic aluminum acetate, which have a basicity of 0.33 to 0.83. Aluminum chlorohydrate is most preferred. Basicity can be adjusted by addition of HCl or other chemicals. Also preferred are the reagents which provide precursors for two or three of the oxides required, such as aluminum-zirconium chlorohydrate, aluminum hafnium chlorohydrate or aluminum-zirconium-hafnium chlorohydrate.

The zirconia content can be derived from a variety of zirconium containing chemicals, including zirconium oxychloride, zirconium acetate, and zirconia particulate. The zirconia particles are commercially available with yttrium oxide and with other stabilizers already added.

Hafnia precursors include hafnium dichloride oxide, hafnium chloride, and particulate hafnia all of which are commercially available. Other reagents can be prepared in the laboratory. These include aluminum hafnium chlorohydrate and aluminum hafnium zirconium chlorohydrate which can be prepared as follows. An appropriate amount of aluminum hydroxide aqueous slurry is reacted with hafnium dichloride oxide (or a mixture of hafnuim and zirconium dichloride oxides) aqueous solution at about 50° to 60° C. for about 2 hours (until all of the aluminum hydroxide has reacted). Aluminum chlorohydrate is then added and the mixture heated to about 80° C. for about 2 hours. Amino acids such as glycine may be reacted with aluminum hydroxide slurry to form the glycinate before reaction with the dichloride oxide. The fourth oxide can be incorporated as any of a variety of alkali, alkaline earth or rare earth compounds such as chlorides and oxides. These would include $Li_2O$, $MgO$, $CaO$, $Y_2O_3$, oxides of the Lanthanide metals and mixtures thereof. These may be present in quantities between 0.002 and 12 volume % based on the total. Yttria is preferred.

Various ways of compounding materials may be employed. The general procedures are described in the Seufert patent, U.S. Pat. No. 3,805,015. Thus, an aqueous dispersion of alumina particles may be combined, in appropriate quantities, with a solution of a zirconium salt, hafnium salt, aluminum chlorohydrate and an yttrium salt. Another method involves combining a slurry of hafnia particles, zirconia particles containing yttrium oxide with an alumina slurry and aluminum chlorohydrate. The mix is stirred, heated, and dewatered for sufficient time to obtain 45 to 65% solids at a useful viscosity. Too much heating must be avoided as this can cause the mix to lose its extensible viscosity. The mix can be converted into fiber in a variety of ways, including drawing from a beaker with a spatula, centrifugal spinning, and extrusion through spinneret holes. For extrusion through a spinneret a viscosity of 400 to 1200 poises is useful. As fibers are formed, they are partially dried to prevent sticking as they are processed further. The fibers can be collected in a variety of ways including being wound up on a bobbin or piddled into a basket. The fibers are further dried and volatiles removed by heating to 400° to 1000° C. The fibers of the invention are prepared by sintering the dried fibers at high temperature to complete the formation of the microstructure and achieve full density and strength. This sintering can be accomplished by placing the fiber in a furnace or flame, or drawing it through a furnace or flame as in U.S. Pat. No. 3,808,015.

In one method, individual fibers are held in the flame of a propane/air torch for a length of time between one and twelve seconds. These fibers can be held at sintering temperatures for a longer period of time without loss of desirable properties. The fibers treated by this method become white hot. In the sintering process, the higher the temperature, and the smaller the diameter of the object being sintered, the shorter the time required for treatment. When sintering in a flame, the type of flame in terms of the fuel-to-oxidant ratio is important. Also, consideration must be given to the number of fibers in the yarn bundle, the diameter of the fibers, and the composition of the fibers in choosing the proper sintering conditions which will provide fibers having a desired level of grain refinement. It will be understood that firing conditions may vary somewhat from those mentioned above.

Scanning electron microscopy (SEM) can be employed to analyze the microstructure of the fibers. Two modes of operation of the SEM can be used in the analyses. An energy dispersive X-ray (SEM/EDX) technique can be used to identify the elemental composition of the grains within the fiber and a secondary electron imaging technique was used to determine grain sizes in a cross-section and the surface of a fiber.

The technique used to measure grain sizes relies on the images obtained using a secondary electron detector of a scanning electron microscope (SEM). The samples are prepared by fracturing the fiber and sputter coating the fiber with gold and placing it in the instrument. Once placed in the instrument, a signal is generated from the sample and is enhanced by adjusting the SEM instrument's secondary scattering detector. In this manner, one can easily obtain a micrograph that clearly shows the individual grains and their sizes.

If desired, the fibers of the invention may be coated with silica which has been shown in Tietz, U.S. Pat. No. 3,837,891, to have a beneficial effect on alumina fiber strength.

TEST PROCEDURES AND MEASUREMENTS
TENSILE TESTING

In this method, single fibers are selected at random and their diameters are measured using a calibrated optical microscope. The gauge length used is one-fourth of one inch. The clamps of the Instron tensile tester are covered with "Neoprene". The clamps of the Instron tester have to be well aligned and the clamp pressure selected carefully so that the filaments are not damaged during testing. The head speed is 0.02 in/min.

Grain Size Determination

Images of the cross-sections and the surface of the fibers are used to measure the overall grain size. The individual filaments are sputter coated with gold to provide a conductive surface and placed in a JEOL JXA 840 Scanning Electron Microscope. Optimization of the secondary electron signal is obtained on each sample and the images recorded of Polaroid type 52 or 53 film. The instrument settings include an acceleration voltage of 10 kV, current of $1 \times 10^{-10}$ Amp, final aperture of 70 microns, filament consisting of tungsten hairpin, working distance of 20–30 millimeters, and a magnification of about 10,000 X. From the images made by this technique, the sizes of the grains can be inferred.

EXAMPLE 1

Spin-Mix Preparation 20 gms of alumina-water slurry with 56.93% alumina (determined by Thermogravimetric analysis) was weighed into a three-necked flask and stirred slowly for about 2½ days in a water bath at 40° C. The pH was measured to be 3.31, measured using a Fisher Accumet Model 815MP. 7.36 gms of zirconyl acetate solution (TGA residue=28.59%) obtained from Harshaw Chemicals were added to the above slurry and stirred well for about 5 minutes. 11.68 gms of "Chlorhydrol" (Reheis Chemicals, Ctrl no. 7536, TGA residue =48.88%) was added and stirred well for about 5 minutes. The pH of the solution was measured and found to be 2.90. 8.30 gms of Hafnium dichloride oxide (HfOCl$_2$) obtained from Alfa (TGA residue =43.35%) were added and the pH was measured to be 1.21. 0.21 gms of YCl$_3$.6H$_2$O from Aldrich Chemicals was added and stirred well. The mixture was of very low viscosity. Vacuum was applied gradually to the mixture to remove water till the mix became thick enough to pull fibers. The solids content of the slurry as measured by TGA was 61.18% at 800° C. at a heating rate of 20° C. per minute. Several long fibers were pulled from the spin mix by hand and then set in 10-inch alumina boats and low-fired.

Low-firing

The filaments were low-fired using a staged cycle as shown below:

| Time 0° C. | Temperature, °C. | Set Point, |
|---|---|---|
| 1045 | 40 | 150 |
| 1100 | 148 | 145 |
| 1129 | 150 | 150 |
| 1310 | 150 | 350 |
| 1318 | 348 | 350 |
| 1343 | 350 | 350 |
| 1407 | 350 | 350 |
| 1408 | — | 700 |
| 1414 | 536 | 700 |
| 1437 | 700 | 700 |
| 1440 | 700 | 700 |
| 1500 | 700 | 700 |
| 1501 | — | 1000 |
| 1509 | 880 | 1000 |
| 1520 | 996 | 1000 |
| 1526 | 999 | 1000 |
| 1530 | 1000 | 1000 |
| 1535 | 1000 | 25 |

Sintering

The fibers were allowed to come to room temperature and then sintered in a Bernzomatic Propane-air torch. The individual filaments were held in the flame with a pair of tweezers for times varying from 2 seconds to 6 seconds. The fibers reached a temperature of about 1830° C. as measured by an optical pyrometer. Quarter-inch lengths of the sintered filaments were then tested in an Instron Tensile Tester. The diameters of the individual filaments were determined using a microscope with a 45X objective and a 15X eyepiece. The filaments had diameters ranging from about 12 microns to about 42 microns. The filament strength appeared to depend strongly on diameter for these fibers with strengths decreasing from about 687 kpsi for the 11.6 micron filament to about 33.5 kpsi for 42.5 micron filaments.

EXAMPLE 2

Spin Mix Preparation 33.55 gms of alumina slurry with 54.93% alumina was weighed into three-necked glass flask and stirred slowly in water bath at 30° C. The pH of the slurry was measured to be 4.234 using a Corning pH/Ion Meter 135. 14.72 gms of zirconyl acetate solution (TGA residue =28.59%) was added and the mixture stirred well for 5 minutes. The pH of the mixture was then measured to be 3.256. 35 gms of deionized water was added to the mixture and the mixture stirred well for 5 minutes. 31.04 gms of Chlorhydrol (Ctrl no. 7536) and 35 gms of deionized water were then added and the mixture stirred well for 5 minutes. 2.0 gms of Concentated HCl (37.8%) was then added and the mixture stirred well for 5 minutes. 14.34 gms of Hafnium Chloride oxide (TGA residue =50.17%) and 0.600 gms of YCl$_3$.6H$_2$O (Aldrich Chemicals) were added. The pH was measured to be 2.350. The mixture was stirred overnight with the bath at 30° C. The pH was measured to be 2.651 the next morning. Vacuum was applied to the system to remove about 80 ml of water. The residue after heating the mix to 600° C. was determined to be 50.1%. The mix was then poured into a metal spin cell and spun through a 0.004 inch and 0.003 inch diameter spinnerets. The extruded filament was dried in a drying zone at 95° C. about 8 inches below the spinneret. The fibers were low-fired in a staged fashion as in Example 1 and then sintered in a Bernzomatic Propane-air flame for 3, 6, 9 and 12 seconds.

Grain Refinement

Figure 2:
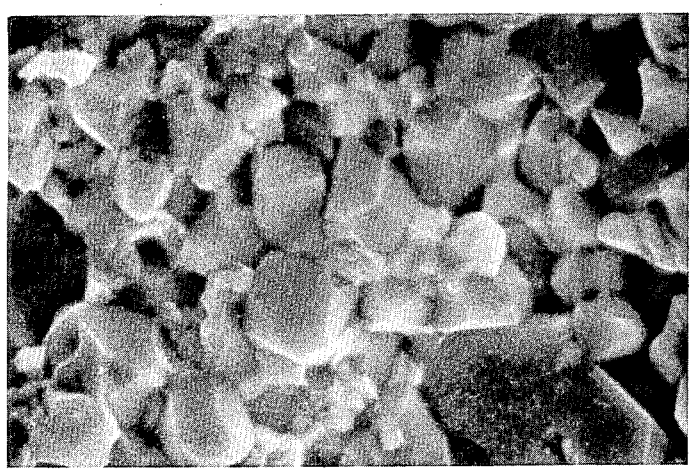
Figure 3:
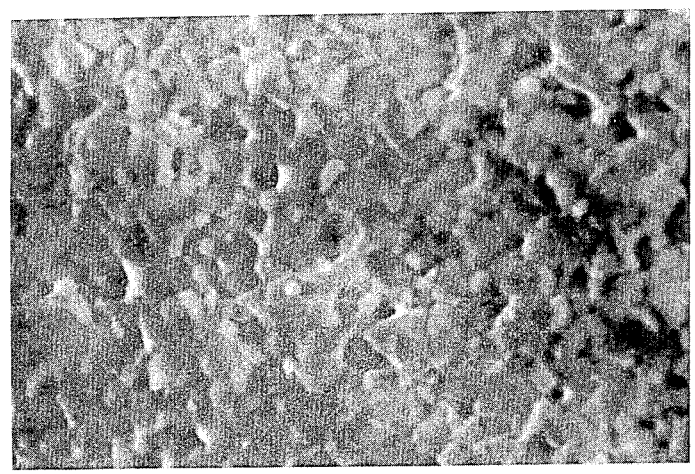
Figure 4:
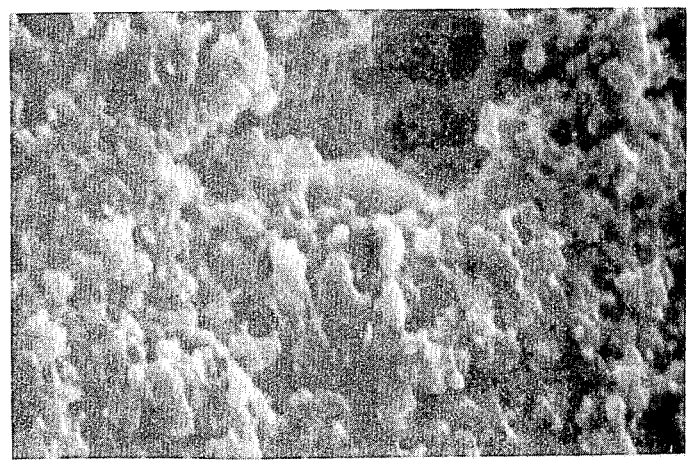
Figure 7:
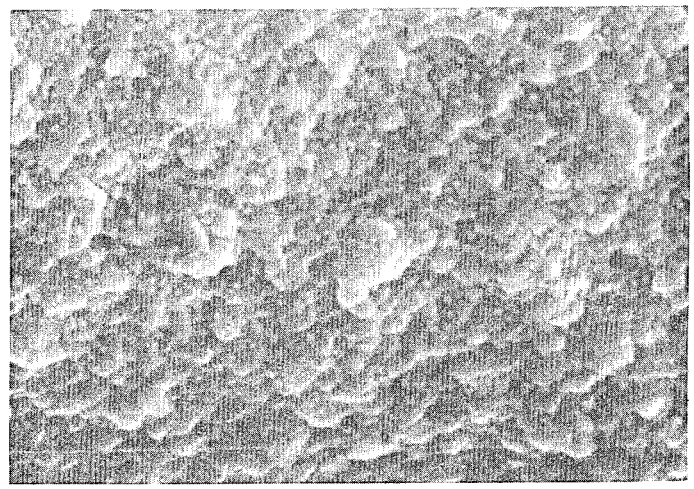
Figure 8:
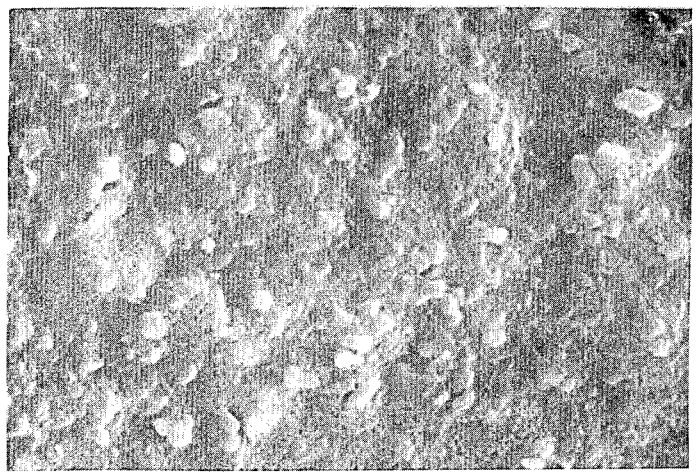

These filaments which were about 30 micron in diameter exhibited a unique grain refinement phenomenon, see FIGS. 1 and 2. In polycrystalline ceramics, the individual grains grow larger in size with increasing sintering times. However, in ceramics of this invention, the grain size decreases with increasing sintering times as shown in the attached micrographs of the surface and cross-section of the fibers. The average quarter inch strength of these approximately 30 micron fibers also increases as the grain size decreases from 148 kpsi at 3 seconds to 173 kpsi at 9 seconds.

I claim:

1. A polycrystalline ceramic shaped article or fiber of from 10 to 125 microns in diameter comprising 50 to 99 volume percent alpha-alumina and from 1 to 49 volume percent hafnia.

2. A fiber of claim 1 comprising 85 to 97 volume percent alumina and from 3 to 15 volume percent hafnia.

3. A shaped article or fiber of claim 1 comprising from 50 to 98 volume percent alpha-alumina, from 1 to 49 volume percent hafnia, from 1 to 49 volume percent zirconia, and a fourth oxide selected from the group consisting of the oxides of lithium, calcium, magnesium, yttrium and the lanthanides, the stabilizer being present in an amount equal to 0.002 to 12 volume percent of the total volume.

4. A fiber of claim 3 comprising from 75 to 96 volume percent alpha-alumina, from 3 to 15 volume percent hafnia and from 1 to 22 volume percent zirconia.

5. A fiber of claim 3 comprising from 80 to 95 volume percent alpha-alumina, from 3 to 15 volume percent hafnia and from 2 to 17 volume percent zirconia.

6. A fiber of claims 3, 4 or 5 wherein the fourth oxide is yttria.

7. A fiber of claims 1, 2, 3, 4 or 5 wherein the diameter is from 10 to 50 microns.

8. A process for refining the grain size of a fiber of claims 1, 2, 3, 4 or 5 consisting essentially of heating the composition to a temperature in excess of 1500 degrees Celsius.

9. A process, for refining the grain size of a fiber of claims 1, 2, 3, 4 or 5 consisting essentially of heating the composition to a temperature in excess of 1700 degrees Celsius.

10. A process for refining the grain size of a fiber of claims 1, 2, 3, 4 or 5 consisting essentially of heating the composition to a temperature in excess of 1800 degrees Celsius.

11. A process for refining the grain size of a fiber of claims 1, 2, 3, 4 or 5 wherein the fourth oxide is yttria and the fiber diameter is from 10 to 50 microns in diameter, said process consisting essentially of heating the composition to a temperature in excess of 1800 degrees celsius.

12. A composite article containing a fiber of claims 1, 2, 3, 4 or 5.

13. A composite article containing a fiber of claims 3, 4 or 5, wherein the fourth oxide is yttria and the diameter of the fiber is from 10 to 50 microns in diameter.

* * * * *